United States Patent [19]

Wendt

[11] Patent Number: 4,912,708

[45] Date of Patent: Mar. 27, 1990

[54] AUTOMATIC MICROPROCESSOR FAULT RECOVERY SYSTEM

[75] Inventor: Rolf H. G. Wendt, Phoenix, Ariz.

[73] Assignee: Siemens Transmission Systems, Inc., Phoenix, Ariz.

[21] Appl. No.: 171,628

[22] Filed: Mar. 22, 1988

[51] Int. Cl.[4] ............................................. G06F 11/00
[52] U.S. Cl. ..................................... 371/16.3; 371/62
[58] Field of Search .................. 371/62, 12, 16, 5, 67, 371/5.1, 5.2, 5.3, 5.4, 5.5, 12, 16.3, 62, 67.1

[56] References Cited

U.S. PATENT DOCUMENTS

| | | | |
|---|---|---|---|
| 4,118,792 | 10/1978 | Struger et al. | 364/900 |
| 4,405,982 | 9/1983 | Ruhnau | 371/12 X |
| 4,529,842 | 7/1985 | Levy et al. | 179/18 |
| 4,538,273 | 8/1985 | Lasser | 371/62 |
| 4,566,101 | 1/1986 | Skonieczny | 371/5 |
| 4,594,685 | 6/1986 | Owens | 364/900 |
| 4,649,537 | 3/1987 | Rosswurm | 371/62 X |
| 4,683,568 | 7/1987 | Urban | 371/12 |
| 4,709,376 | 11/1987 | Kage | 371/5 X |
| 4,727,549 | 2/1988 | Tulpule | 371/62 |

FOREIGN PATENT DOCUMENTS 8603312  6/1986  World Int. Prop. O.

Primary Examiner—Michael R. Fleming
Assistant Examiner—Robert W. Beausoliel
Attorney, Agent, or Firm—Jeffrey P. Morris

[57] ABSTRACT

Telecommunications equipment used in outdoor environments are subjected to harsh electrical conditions. Circuits which utilize sequential components, such as microprocessors, can therefore become confused due to extraneous power surges which may occur in the harsh conditions existing around the equipment. Furthermore, maintenance of the equipment has become much more automated, often leaving the equipment unattended for extended periods of time. In accordance with the invention, a circuit which automatically and reliably recognizes the failure conditions in the microprocessor, and automatically forces the microprocessor to recover is described.

8 Claims, 2 Drawing Sheets

CLOCK REF.

D0: D8

SELECT

WRITE ENABLE

AUTOMATIC MICROPROCESSOR FAULT RECOVERY SYSTEM

BACKGROUND OF THE INVENTION

1. Field of the Invention

The present invention relates generally to circuitry for use in protecting against microprocessor failure, and specifically to circuitry for recognizing such failure, whether resulting from hardware or software faults, and which causes the hardware independently of the associated software, to check the microprocessor operation. The present invention is particularly advantageously applicable to telecommunications equipment which must operate in outdoor environments which subject the equipment to harsh electrical conditions. In addition to use in protecting against fault conditions in microprocessors, the present invention is generally advantageously applicable to any circuitry which includes sequentially operating components, which can malfunction due to extraneous power surges to which the circuitry may be subjected.

2. Description of the Prior Art

When a microprocessor device is used in a harsh environment which is susceptible to lightning, and other electrical power surges, the possibility of an error being induced and occurring during software operation in a microprocessoor based system is likely. Assuming that the majority of the damage of the lightning hit or power surge is dissipated elsewhere within the system, it still remains likely that a short malfunction or electrical problem may be caused in the microprocessor, thereby confusing its operation. It is essential that the microprocessor does not continue running normally once its operation has become confused. A prior art circuit is often used which ensures that the microprocessor does not continue in normal operation.

Such a prior art circuit is known as a "watchdog timer" which is normally a basic counter which must be reset by the microprocessor periodically to prevent the watchdog timer from reaching its maximum or minimum count. If the timer does reach its maximum or minimum count, it assumes that the microprocessor has become lost or is operating erroneously and forces a hardware reset, or an interrupt to occur.

An example of such a prior art circuit is a counter which is reset each time that a specific address is written to. This is not a very reliable solution, since the software associated with the microprocessor will periodically use the same invariant instruction set to reset the watchdog timer. Since there is no variation in the data byte or address written to the circuit, the microprocessor will continue resetting the timer even after it has become entirely confused. This circuit is the simplest configuration in the prior art, and also the least costly.

Another known alternative is to devise a complex pseudo-random pattern which must be calculated in software and in external hardware simultaneously. The pattern must match precisely in order to reset the watchdog timer. This approach may consume quite a bit of external hardware, plus consuming vast amounts of processing time for the calculation of each watchdog timer reset. This circuit is the most complex and the most costly configuration of the prior art.

Some examples of the above described prior art circuits are U.S. Pat. No. 4,594,685, Watchdog Timer; U.S. Pat. No. 4,538,273, Dual Input Watchdog Timer; U.S. Pat. No. 4,118,792, Malfunction Detection System For a Microprocessor Based Programmable Controller; and U.S. Pat. No. 4,529,842, Automatic Fault Recovery Arrangement. All of the aforementioned prior art patents rely primarily on the correct operation of software with little or no checking of such software by the external hardware.

In accordance with the present invention, a pseudo-random pattern of correct command sequences is forced to prevent the circuit from resetting itself. A byte-wide binary counter is used to produce a fixed sequence of patterns which must occur in order to properly reset the watchdog timer. The counter is incremented after each successful reset. The next reset must match the pattern which exists in the counter, or the timer will time out and the processor will be interrrupted. The circuit can be accomplished by using a minimum of external components.

SUMMARY OF THE INVENTION

The present invention is a watchdog timer that utilizes few components yet increases the probability of a system recovering from a serious error which could occur during microprocessor operation. Such an error could result from either a flaw in the software code, or by a fault in the hardware. The watchdog timer is intended to force a hardware reset after a period of time, unless the timer is reset by software. Known watchdog timers utilize a simple counter with a single lead which is pulsed by a WRITE to a specified address and data bit. If the watchdog timer is not reset by the end of the specified time interval, the timer either interrupts the processor so that recovery would begin, or resets the processor entirely, thus causing the software to begin again at the beginning.

The watchdog timer of the present invention is more likely to detect a software fault. In order to reset the timer, a predetermined sequence of bytes must be written to the watchdog reset address. If the correct data is not written to the watchdog address, the watchdog timer will eventually time out and cause a non-maskable interrupt, or a system reset, thus allowing the program to recover automatically without manually forcing a reset.

It is therefore a primary object of the invention to provide a secure microprocessor based telecommunications system that is operable under harsh environmental conditions in the field.

Another object of the invention is to provide a watchdog timer circuit that recognizes an error condition and forces the microprocessor to automatically recover from such an error condition without manual intervention.

The foregoing and other features and advantages of the invention will become apparent from the following detailed description of a preferred embodiment of the invention as illustrated by the accompanying drawings, wherein:

DESCRIPTION OF THE PREFERRED EMBODIMENT

Figure 1:
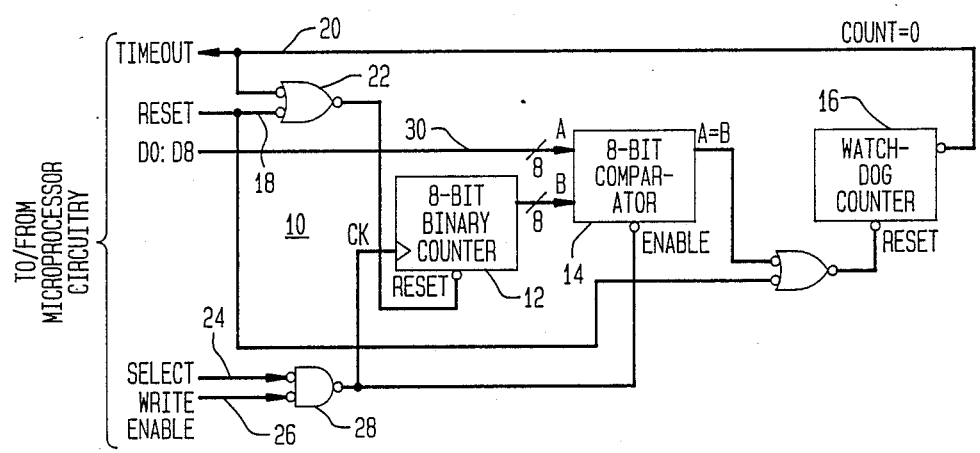
FIG. 1 is a block diagram of a microprocessor fault recovery circuit in accordance with the present invention.
Figure 2A:
FIGS. 2A, 2B, 2C and 2D are a series of waveform diagrams useful in explaining the operation of the circuit of FIG. 1.
Figure 2B:
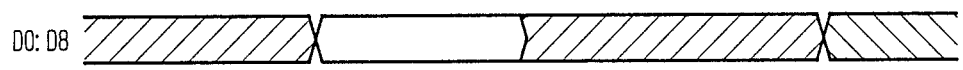
Figure 2C:
Figure 2D:
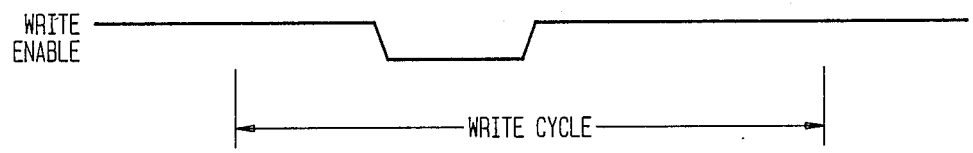

Referring to FIG. 1, the fault recovery circuit of the invention is shown generally at 10, wherein an implementation comprising three basic electronic components and a few simple logic gates is shown, arranged into three discrete sections. An eight-bit binary counter 12 is used to maintain the current data byte value in a separate hardware register. The counter 12 generates a pseudorandom bit pattern independently of software. An 8 bit comparator 14 compares the data byte presently stored within the eight bit counter to the data byte existing on the data lines which originate from the microprocessor. If the two data bytes are equivalent, a watchdog counter 16 will be reset. If the watchdog counter 16 is not reset, a non-maskable interrupt, (NMI) will occur on the microprocessor and a recovery action will be initiated.

The eight bit counter 12 generates the sequence (pseudorandom bit pattern) necessary in hardware to prevent the timer from interrupting the microprocessor. The counter 12 is reset when either a system reset occurs on line 18 or whenever the timer has timed-out as indicated on line 20, either of which conditions is coupled via OR gate 22, which provides a RESET to the counter 12. This provides a fixed data point reference for which the microprocessor software will use as its base. The counter 12 is then automatically incremented after each write access to the watchdog timer.

The counter 12 is incremented on the rising edge of the write cycle which is the time that the watchdog circuit is selected on line 24 and a write function is enabled on line 26 simultaneously via AND gate 28. Since the counter 12 is incremented on the rising edge of the write strobe, this follows the time that the compare operation occurred, and the watchdog timer has been either successfully or unsuccessfully reset.

An eight bit comparator 14 is used to compare the data byte stored in the eight bit counter 12 to an 8-bit data byte that is written to the watchdog circuit on the data bus 30. One set of inputs to the comparator 14 is connected to the data bus 30. The second set of inputs to the comparator 14 are connected to the outputs of the eight bit counter 12. The comparator 14 is enabled when the circuit is selected via line 24 for a write access. If the two bytes in the comparator 14 bytes are equal, the output of the comparator will go logic "low".

The output of the comparator 14 is coupled to the reset lead of the timer itself. The interval of the timer is chosen to accommodate the needs of the microprocessor software. Sufficient time must be allocated to allow the software to reset the timer without significantly decreasing the efficiency of the software. A typical time interval would be on the order of approximately 0.5 seconds. The circuit implementation in FIG. 3 of FIG. 1 uses a 13 bit counter which counts up to 8192. The counter uses an 8 kilohertz clock as its input. The most significant bit is inverted, forcing a low condition after 4096 counts. This corresponds to 0.512 seconds. If the timer is periodically reset by the comparator, however, the count should not exceed 4095, and the counter output at Q13 will always remain at a high logic level, thereby never resetting the microprocessor. If the timer is not reset within the allocated period, the timer will time-out causing an interrupt or reset to occur, thereby forcing the microprocessor to recover automatically. The hardware thus forces the time out condition if the appropriate data byte is not written on the data line 30, e.g. the microprocessor is reset independently of the associated microprocessor software.

Figure 3:
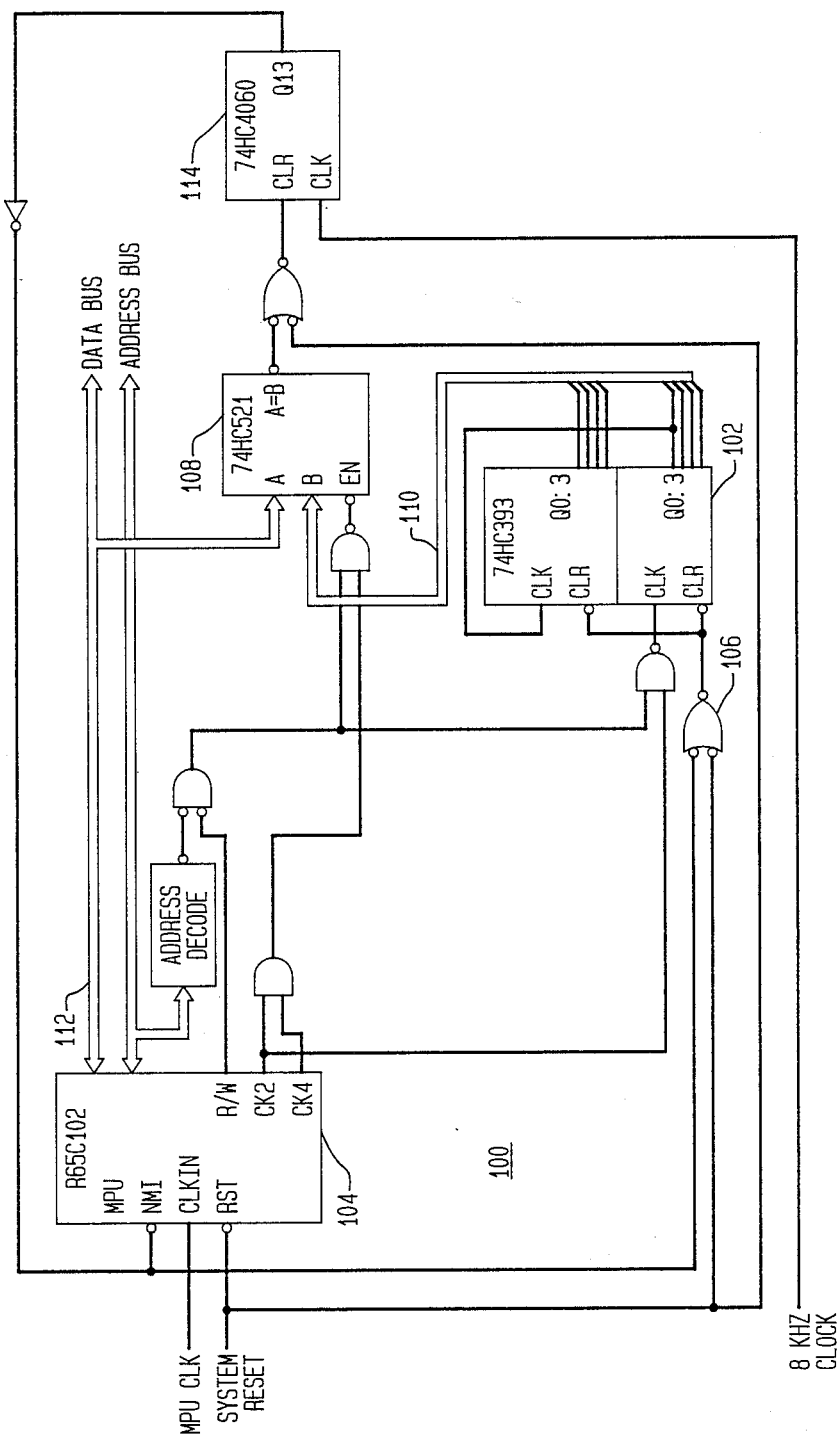
FIG. 3 is a more detailed circuit diagram of the microprocessor fault recovery circuit described with reference to FIG. 1.

While the illustrated embodiment was designed to function with an R65C102 microprocessor shown at 104 manufactured by Rockwell International, any microprocessor may be effectively coupled to the described embodiment. Referring to FIG. 3, an R65C102 model microprocessor is shown, coupled to the fault recognition circuit of the invention, shown generally at 100. The 8-bit binary counter 12 is implemented by a 74HC393 dual four bit binary counter at 102, series connected, and allowing the generation of a single 8-bit data byte. Counter 102 is an off-the-shelf component manufactured by National Semiconductor Corporation, as are components 108 and 114.

The reset lead of the counter 102 is derived through an OR-ing of the system reset, and the time-out lead at OR gate 106. This forces the data byte to a predetermined point following either a hardware reset or a watchdog time-out condition. Since the microprocessor in the described embodiment provides a 4× clock output, the write cycle can be broken into two discrete segments. One write cycle is used to enable the compare operation and timer reset, while a second write cycle is used to trigger the count of the byte generator. This ensures that there is sufficient time for the compare-and-increment cycle and the underlined possibility of an increment-and-compare cycle is eliminated. This, of course is a simple precaution as there should be ample delay in the counter to prevent this condition from occurring in the configuration described in FIG. 1.

The outputs of the eight bit counter 102 are connected to a National Semiconductor 74HC521 eight bit comparator 108 via line 110. The second set of inputs of the comparator 108 are directly tied to the data bus 112. The comparator 108 is enabled as described before, on the second clock cycle of the 4× clock. The A=B output of the comparator 108 is then inverted and tied to the reset lead of a 74HC4060 14-bit counter shown at 114 whose Q13 output is inverted and returned to the NMI of the microprocessor 104. The counter 114 clock is derived from an eight kilohertz pulsed signal. The allocated time out interval is therefore fixed at 0.512 seconds, allowing ample opportunity for the microprocessor software to respond.

In order for the aforementioned watchdog timer to operate to its fullest capability, the microprocessor software must be configured so that the value of the watchdog byte is not maintained at a global location. Such an undesired software structure would eliminate the greatest advantage of the circuit, specifically the necessity of generating a sequential data byte required for preventing the circuit from timing out. With the foregoing disclosure, a programmer can so configure any associated microprocessor software in accordance with the teachings of the invention. Since the timer will be periodically reset, a simple read-increment-write process at a global address location will be repeated at many points in the software. If the processor does become lost, there is a good chance that the timer will be once again reset and processing will continue. Such a simple programming operation is well within the skill of a programmer, having knowledge of the aforementioned information.

By way of further disclosure to such a programmer, the software procedure to be used is to vary the address location of the Watchdog byte. This is best done through the use of a stack. The value of the Watchdog byte should be transferred between subroutines on the stack, and a copy made in a global address for use on interrupt routines. This would ensure that an error condition will be automatically recognized and acted upon.

While the present invention has been described in connection with a preferred embodiment thereof, it is to be understood that additional embodiments, modifications and applications will become obvious to those skilled in the art, and are included within the spirit and scope of the invention as set forth by the claims appended hereto.

I claim:

1. An automatic fault recovery circuit for a microprocessor based system, comprising
   byte-wide binary counter means for generating a pseudorandom bit pattern;
   watchdog timer means having a reset input for resetting said watchdog timer to prevent said watchdog timer means from timing out;
   means for using said pseudorandom bit pattern to reset said watchdog timer means, such that said watchdog timer means can only be reset by said pseudorandom bit pattern;
   counter means associated with said watchdog timer means which is incremented after each reset, such that a subsequent reset input must correspond to the current counter pattern to prevent said watchdog timer means from timing out; and
   means for providing an interrupt signal to said microprocessor when said watchdog timer means times out.

2. An automatic fault recovery circuit in accordance with claim 1 wherein said interrupt signal produces a non-maskable interrupt of said microprocessor.

3. An automatic fault recovery circuit in accordance with claim 1 wherein said binary counter is at least an 8-bit binary counter.

4. An automatic fault recovery circuit in accordance with claim 1 further comprising:
   comparator means for comparing a data byte stored in said binary counter to a data byte on a data line from said microprocessor, and for generating an output signal for resetting said watchdog timer when the two data bytes compared are equal.

5. An automatic fault recovery circuit in accordance with claim 4 wherein said counter is reset either when said watchdog timer times out or when a system reset occurs.

6. An automatic fault recovery circuit in accordance with claim 4 wherein the pseudorandom bit pattern is a sequential data byte.

7. An automatic fault recovery circuit in accordance with claim 1 wherein said watchdog timer means is a counter which times out by reaching a predetermined value.

8. An automatic fault recovery circuit in accordance with claim 6, further including means for distributing said sequential data byte at a plurality of address locations in software associated with said microprocessor.

* * * * *